(No Model.)
J. ROGGINGER.
SPEED INDICATOR.
No. 553,724. Patented Jan. 28, 1896.
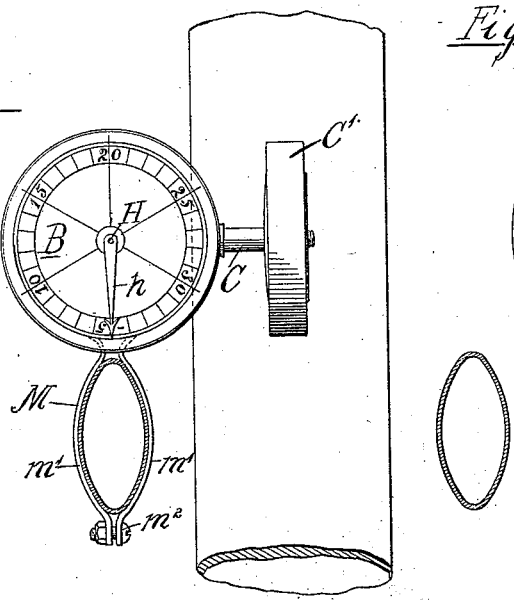
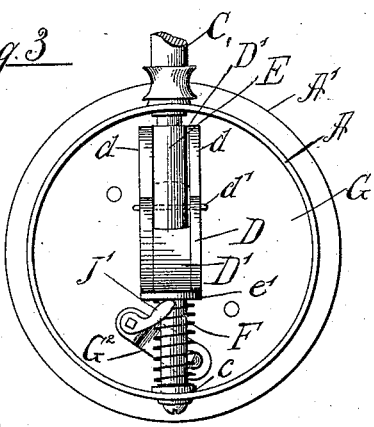
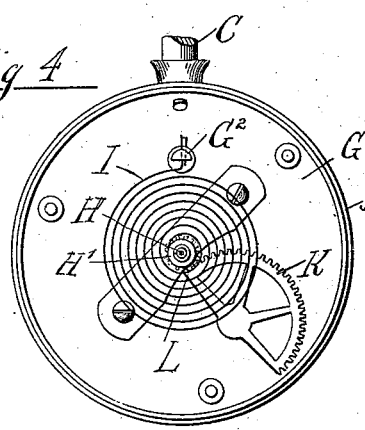
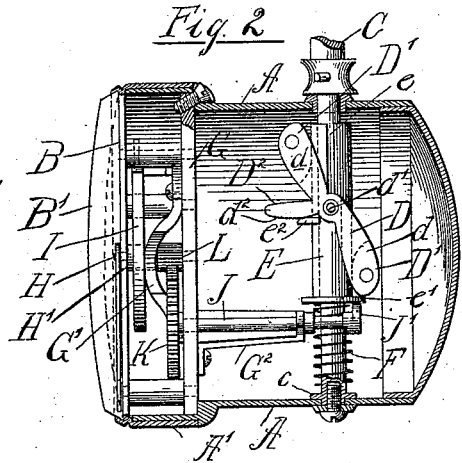
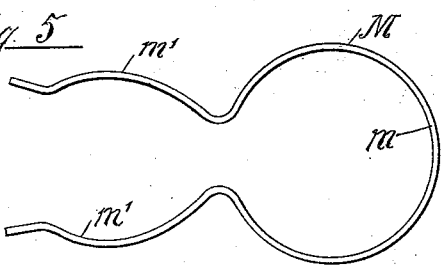
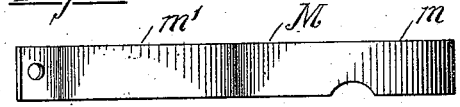
Witnesses
Clinton Hamlink
John W. Adams
Inventor
John Rogginger
by Dayton, Poole & Brown
his Attorneys

UNITED STATES PATENT OFFICE.

JOHN ROGGINGER, OF CHICAGO, ILLINOIS.

SPEED-INDICATOR.

SPECIFICATION forming part of Letters Patent No. 553,724, dated January 28, 1896.

Application filed April 1, 1895. Serial No. 544,025. (No model.)

*To all whom it may concern:*

Be it known that I, JOHN ROGGINGER, of Chicago, in the county of Cook and State of Illinois, have invented certain new and useful Improvements in Speed-Indicators; and I do hereby declare that the following is a full, clear, and exact description thereof, reference being had to the accompanying drawings, and to the letters of reference marked thereon, which form a part of this specification.

This invention relates to an improved speed-indicator more especially intended for use in connection with bicycles, tricycles, and the like, the same being a device designed to show to the rider at any time the speed or rate of progress at which the vehicle is being propelled.

The invention consists of the matters hereinafter described, and pointed out in the appended claims.

In the accompanying drawings, Figure 1 is a view showing the front fork of a bicycle in horizontal section and a part of a wheel-tire in plan view, together with a top view of a speed-indicator which is attached to one bar of the fork. Fig. 2 is a sectional view through the casing of an indicator shown in Fig. 1. Fig. 3 is a view in elevation of the parts within the casing as they appear when the rear or bottom cover thereof is removed. Fig. 4 is a similar view taken from the front or dial side of the casing when the dial is removed. Figs. 5 and 6 are top and side views, respectively, of the metal clamp used for attaching the speed-indicator to one of the bars forming the front fork of a bicycle.

Referring first to the main operative parts of the indicator, the same are contained within a short cylindric casing A, having at one end an enlargement or head A', within which is located a graduated dial B, which is covered by a glass or crystal B' in the same manner as an ordinary watch-dial. The said casing is supported on the machine with the dial B uppermost and horizontal, so that it will be easily visible to the rider.

C designates a revoluble shaft which extends diametrically through the main part of the casing A and has its bearings on the opposite walls thereof. Said shaft C, when the indicator is attached to the vehicle, stands in a horizontal position with its axis of rotation parallel with the wheel-axis. Said shaft C extends at one end a considerable distance outside of the casing A, and attached to its outer end is a bearing disk or pulley C', which is adapted to rest upon the rim or tire of the wheel and is given rotary motion by its frictional contact therewith.

Pivoted to the shaft C within the casing is a lever D, which is preferably double-ended, and arranged to extend at its opposite ends at equal distances from its pivotal axis. Said lever is provided at its opposite ends with weights D'. Said lever is shown as consisting of two side plates $d\ d$, which extend at opposite sides of the shaft and between the outer ends of which the weights D' D' are secured, the lever being pivotally connected with the shaft by means of a transverse pivot $d'$, which extends through the said side plates and the shaft in the manner illustrated. Said lever stands normally in a position nearly parallel with the shaft, and the weights D' by centrifugal action tend to throw or turn the lever D into a position at right angles to the shaft when the latter is rotated. The said lever D is provided with two lateral arms $D^2 D^2$ arranged opposite the pivot of the lever or nearly so and herein shown as formed by integral projections on the plate $d\ d$.

E is a sliding sleeve mounted on the shaft C and held from turning on the shaft, preferably by being extended past the pivot $d'$ of the lever and having slots $e\ e$ for the passage of said pivot, the pivot by its engagement with the slots preventing the sleeve from turning on the shaft, but allowing it to move freely endwise thereon. At its end remote from the lever said sleeve is provided with a flange $e'$, and adjacent to said lever it is provided with lateral projections or lugs $e^2$ adapted for engagement with the arms $D^2$ of the lever D. The lugs or projections $e^2$ are shown as having the form of a partial flange on the sleeve; but this construction is immaterial and they may be attached to or formed on the sleeve in any manner found convenient or desirable. The bearing faces or edges $d^2$ of the arms $D^2$, which come in contact with the lugs $e^2$, are curved or made of cam shape, as shown. The arms $D^2$, acting on the said lugs $e^2$ as the outer ends of the lever are thrown outward, serve to give endwise movement to the sleeve E.

A coiled spring F is placed around the shaft C between a shoulder $c$ on said shaft and a flange $e'$ at the end of the sleeve, said spring tending to thrust the sleeve endwise on the shaft toward the lever and to maintain the lugs $e^2$ in contact with the arms $D^2$.

In the head A' of the casing, inside of and parallel with the dial B, is a partition-wall G, and in the space between said wall and the dial is mounted a spindle H, the outer end of which extends through the center of the dial and is provided with an index hand or pointer $h$. Said spindle H is shown as mounted at its inner end on a bearing-aperture at the center of the wall G and as having a bearing near its outer end in a bearing-bracket G' attached to the partition G. Between the bracket G' and the dial is located a spring I having the form of a flat spiral coil, the same being similar to the hairspring of a watch or clock. Said spring tends to turn the shaft H in such manner as to hold the index-hand $h$ normally at the zero-point of the dial. Said spring is attached at its inner end to a sleeve or collar H' on the spindle H and at its outer end is secured to a post $G^2$ on the plate G. To provide for adjustment of the tension of said springs the collar H' is split at one point and is held on the shaft by its frictional engagement with the same, thereby enabling the collar to be turned to a desired extent in the shaft by the application of a suitable implement thereto.

Devices are provided for transmitting motion from the endwise-moving sleeve E to the spindle H, so as to turn the spindle against the action of the spring I, said device being made as follows:

J is a rock-shaft which is arranged at right angles to the shaft C and perpendicularly to the partition-wall G, said shaft passing through said partition-wall at one end and extending at its opposite end at one side of the shaft C. The said rock-shaft is shown as mounted at one end in the plate G and at its opposite end in a bracket $G^2$, which is secured to the wall G and extends outwardly to a point near to the shaft C. At the end of said rock-shaft J, adjacent to the shaft C, is secured a radial arm J', the end of which bears against the flange $e'$ of the sleeve E, and by which endwise movement of the said sleeve is converted into oscillatory movement of the shaft. Secured to the end of said rock-shaft J, which extends through the wall G, is a gear-segment K, which intermeshes with the gear-pinion L secured upon the spindle H between the bracket G' and the wall G, said gear-segment K serving to transmit oscillatory movement from the rock-shaft J to the spindle H. The said gear-segment is made much larger radially than the pinion, so that a comparatively slight movement of the rock-shaft will produce a considerable rotary movement of the said spindle. The end of the arm J' of the rock-shaft which bears against the flange $e'$ is convexly rounded or curved in the manner illustrated, so that the said flange will remain constantly in bearing with the curved outer end of the arm, notwithstanding the changed angular position or relation of the parts occurring when the sleeve is moved endwise on the shaft.

The action of the indicator as a whole is as follows: The shaft C being rapidly driven or rotated by the contact of its pulley C' with the wheel-tire, the end of the lever D will be thrown outwardly by the centrifugal action of the weighted ends of said lever. As the outer ends of the lever move outwardly, the curved edges of the bearing-arms $D^2$, acting on the sleeve E, will move said sleeve endwise on the shaft, thereby turning the rock-shaft J and the spindle H, so as to give rotary motion to the index-hand $h$, corresponding with the extent of movement of the centrifugally-acting weights. In its operation of the parts the spring F, which is applied to the sleeve in the manner described, serves to take up any lost motion in the parts, and thus insures accuracy of motion, it being obvious that in the absence of such spring the lugs $e'$ would be pressed against the arms $D^2$ solely by the action of the spring I, transmitted through the several moving parts, so that any lost motion resulting from looseness of the working parts would affect the accuracy of the indication.

The spring I is made of suitable length and has a number of convolutions so that it will act, as far as practicable, with uniform effect on the spindle in all positions of the index-hand. The spring F is also made to give uniform pressure or action as nearly as possible.

The main feature of my invention is embraced in the shape of the bearing surfaces or edges $d^2$ of the arms $D^2$, which surfaces or edges, as before stated, are made of cam shape. In their general form said curved surfaces or edges $d^2$ are approximately at right angles with the lever G at their inner ends and are curved outwardly in convex form away from a line at right angles to the lever. The curvature of said arms is such as to give a uniform pressure on the sleeve, which is moved by said arm, notwithstanding the varying force exerted by the centrifugal weights as they are thrown or moved outwardly, such varying force arising from the fact that the weights approach a position more nearly at right angles to the shaft as they move outwardly, for this reason exerting relatively less outward pressure, while at the same time they exert increasing centrifugal action as they move farther away from the central axis of the shaft. While it is possible that the proper curvature to be given to the arms might be determined mathematically by consideration of the varying effect of centrifugal force on the weights as they move outwardly in their curved path, yet, practically, I find it advantageous to determine the proper curvature by experiment, making the curvature such that the sleeve and the index-hand actuated thereby will be moved through equal distances for equal increases of speed. In other words, the curvature of such arms is so adjusted as to give practically the same force to move the index-hand against the action of the springs which oppose the action of the weights during all parts of the movement of said weights, notwithstanding said weights move in a curved path. One very important advantage gained by this construction is that it enables the dial to be marked with a scale which is uniform in the distances of its divisions from each other, thereby making it much easier to construct and more easily read.

For securing the indicator to the front forks of a bicycle or other upright frame-piece of a vehicle, adjacent to a wheel thereof, I have provided an attaching device which is made as follows:

M, Figs. 1, 5 and 6, is a sheet-metal clamp consisting of a strip of metal bent at its middle to form a ring $m$ adapted to encircle and embrace the casing A and having at its end portion two outwardly-bent parts $m'$ which fit against and embrace one of the forks of the bicycle, when the ends are secured or clamped together by means of a clamping screw or bolt $m^2$, such as seen in Fig. 1. The clamp thus made serves to sustain the indicator proper in front of and opposite one of the front forks with its dial upmost and the pulley C' above and in contact with the tire of the front wheel.

The attaching device described, therefore, while very simple in its construction, serves to support the indicator in proper position for actuation by the wheel-tire and in a position which is at the same time convenient for observation of the indicator-dial by the rider.

A great advantage is obtained by locating an indicator which is driven from the wheel of the bicycle above the front wheel of the bicycle and in front of the forks, with its driving-pulley located over and in contact with the rubber wheel-tire, for the reason that not only does the contact of the rubber tire insure positive and certain driving of the indicator, but any annular bearing-surface, such as has heretofore been placed on the hubs of the wheels, is rendered unnecessary. At the same time the indicator, by my construction, is brought near the eye of the rider, so that it may be more easily observed and is at the same time located at a point where it is out of the way of the rider, and not liable to be injured by contact with external objects in case of the upsetting of the machine or other accident.

I claim as my invention—

1. A speed-indicator comprising a revolving shaft, a weighted lever pivoted thereto and provided with a laterally-extending arm provided with a curved or cam-shaped bearing edge, a sleeve sliding endwise on the shaft and provided with a lug which engages said curved bearing edge of the arm, an indicating device and actuating connections between the said sleeve and the indicating device, said curved bearing edge being so shaped that the indicating device will be moved equal distances for equal changes in speed, substantially as described.

2. A speed-indicator comprising a revolving shaft, a weighted lever pivoted to the shaft and provided with a laterally-extending arm having a curved or cam-shaped bearing edge, a sleeve sliding endwise on the shaft and having a lug which engages the bearing edge of said arm, a spring applied to said sleeve to hold the lug in contact with the said arm, an index-hand, a dial, a spindle arranged at right angles with said shaft and carrying the index-hand, a spiral spring applied to move the spindle in one direction, a pinion on the spindle, a rock-shaft arranged parallel with the spindle, a gear-segment attached to the rock-shaft and intermeshing with the said pinion, and an arm on the said rock-shaft engaging the said sleeve, for transmitting the endwise motion thereof to the rock-shaft, the said curved edge of the arm being shaped to move the index-hand equal distances for equal changes of speed, substantially as described.

3. A speed-indicator comprising a revolving shaft, a weighted lever connected thereto by a transverse pivot extending through the shaft, and provided with a laterally-extending arm having a curved or cam-shaped bearing edge, a sleeve which is moved endwise on the shaft by the said weighted lever and is provided with an arm to engage said curved bearing edge and longitudinal slots which engage the pivot to hold the sleeve from turning on the shaft, a movable indicating device, and actuating connections between said sleeve and the indicating device by which the longitudinal movement of the sleeve is transmitted to the latter, substantially as described.

In testimony that I claim the foregoing as my invention I affix my signature, in presence of two witnesses, this 28th day of March, A. D. 1895.

JOHN ROGGINGER.

Witnesses:
 EDA NEMETT,
 N. SEASTRUM.